United States Patent
Kalik

(10) Patent No.: US 7,579,942 B2
(45) Date of Patent: Aug. 25, 2009

(54) EXTRA-VEHICULAR THREAT PREDICTOR

(75) Inventor: Steven F. Kalik, Arlington, MA (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 312 days.

(21) Appl. No.: 11/539,686

(22) Filed: Oct. 9, 2006

(65) Prior Publication Data

US 2008/0084283 A1 Apr. 10, 2008

(51) Int. Cl.
*B60Q 1/00* (2006.01)

(52) U.S. Cl. .................. 340/435; 340/436; 340/438; 340/439; 340/425.5; 340/903; 340/933; 340/988; 701/301

(58) Field of Classification Search ............. 340/435, 340/436, 438, 439, 425.5, 903, 988, 995.17, 340/933; 180/166, 167; 701/300, 301
See application file for complete search history.

(56) References Cited

U.S. PATENT DOCUMENTS

| | | | |
|---|---|---|---|
| 4,232,313 A | | 11/1980 | Fleishman |
| 5,309,137 A | | 5/1994 | Kajiwara et al. |
| 6,429,789 B1 | | 8/2002 | Kiridena et al. |
| 6,487,500 B2 * | | 11/2002 | Lemelson et al. ........... 701/301 |
| 6,505,085 B1 | | 1/2003 | Tuttle et al. |
| 6,539,290 B1 | | 3/2003 | Vos |
| 6,580,973 B2 | | 6/2003 | Leivian et al. |
| 6,643,627 B2 | | 11/2003 | Liaw et al. |
| 6,727,807 B2 | | 4/2004 | Trajkovic et al. |
| 6,799,104 B2 | | 9/2004 | Yao et al. |
| 6,859,689 B2 | | 2/2005 | Vos |
| 6,861,957 B2 * | | 3/2005 | Koike ........................ 340/903 |
| 7,072,753 B2 | | 7/2006 | Eberle et al. |
| 2003/0112132 A1 | | 6/2003 | Trajkovic et al. |
| 2003/0227395 A1 | | 12/2003 | Zeineh |
| 2005/0030184 A1 | | 2/2005 | Victor |
| 2005/0038573 A1 | | 2/2005 | Goudy |
| 2005/0114105 A1 | | 5/2005 | Barber |
| 2006/0006990 A1 | | 1/2006 | Obradovich |
| 2008/0167819 A1 * | | 7/2008 | Breed ........................ 701/300 |

FOREIGN PATENT DOCUMENTS

WO   WO-2004/027704   4/2004

OTHER PUBLICATIONS

Jansson, J., J. Johansson, F. Gustafsson. "Decision Making for Collision Avoidance Systems." Society of Automotive Engineers, Inc. 2002.

* cited by examiner

*Primary Examiner*—Hung T. Nguyen
(74) *Attorney, Agent, or Firm*—Gifford, Krass, Sprinkle, Anderson & Citkowski, P.C.

(57) ABSTRACT

An apparatus for facilitating the safe operation of a vehicle comprises a sensor system, a sensor signal to object identifier, and a world model implemented using, for example, a multiple-input multiple-output (MIMO) algorithm such as a spiking neuron algorithm. Alerts may be provided to the vehicle operator under several conditions, such as the identification of a collision risk between the vehicle and an object, identification of a vehicle risk due to excessive uncertainty in the predicted vehicle path, or identification of an object risk due to excessive uncertainty in a predicted object path.

21 Claims, 5 Drawing Sheets

EXTRA-VEHICULAR THREAT PREDICTOR

FIELD OF THE INVENTION

The present invention relates to sensor systems, in particular to apparatus and methods for assisting the driver of a vehicle to avoid collision hazards.

BACKGROUND OF THE INVENTION

Vehicular accidents are a major source of injury and economic loss. Conventional systems for reducing the likelihood of accidents include blind spot sensors and vehicle lane tracking sensors. However, conventional systems do not include the prediction of risks from unpredictable behavior, such as by the driver of a vehicle having the system, or by other drivers.

SUMMARY OF THE INVENTION

An example of the present invention includes a system architecture operable to produce adaptive models of objects and their relative positions and movements in the world, to observe, review, and predict danger from either paths that will intersect in the future, or from behaviors that are too erratic to predict. An example system uses the multiple-input multiple-output (MIMO) architecture of spiking neuron systems analogous to those found in the brain and nervous system.

An example system maintains a world model of the environment of a vehicle. The system for threat prediction is associated with a vehicle, the vehicle having sensors for establishing the nature of its environment. In one example, the vehicle is an automobile, and the vehicle operator is the driver, The term "vehicle", unless otherwise indicated, refers to the vehicle having an example system according to the present invention. For clarity, this may also be referred to as the sensing vehicle. The term "object" is used to refer to objects in the vehicle environment, which can include other vehicles of the same or different type, pedestrians, animals, emergency vehicles, and fixed objects such as trees or posts. Typically, there will be numerous other objects in the vehicle environment. However, for simplicity, examples may be described in terms of a single object. The invention is not limited to such examples, as multiple objects may be detected, and their paths predicted.

Changes in the world model are determined by comparing a current world model with a stored previous world model. Changes may correspond to vehicle parameter changes (for example, motion of the vehicle), and changes in the parameters of one or more objects in the environment of the vehicle. Changes in the object parameter changes may be corrected for the change in vehicle parameters, for example to compensate for vehicle movement.

Alerts to a vehicle operator may be provided in the following three cases: the vehicle behavior is unpredictable, for example if the vehicle operator is having control problems; the behavior of an object in the vehicle environment is unpredictable, for example another vehicle with a driver is having control problems; or if a collision risk exists between the vehicle and an object in the environment.

Further, systems according to the present invention can be used in non-vehicular applications, such as a helmet-mounted apparatus to assist a person on foot.

DETAILED DESCRIPTION OF THE INVENTION

A system according to the present invention simultaneously models vehicle movement and the movement of other vehicles in the environment, to permit near-term prediction of the vehicle's own behavior and of that of the other objects in the extra-vehicular environment.

Embodiments of the present invention include a system architecture and methods based on the multiple-input multiple-output (MIMO) architecture of spiking neuron systems in the brain and nervous system to produce adaptive models of objects and their relative positions and movements in the world. The system acts to observe, review, and predict danger from either paths that will intersect in the future, or from behaviors that are too erratic to predict. The use of MIMO systems (particularly independently active spiking neuron component based systems that can perform many calculations in parallel), provide a more time- and energy-efficient architecture to perform the necessary calculations than used in any previous system.

The system can adaptively model the object, position, and other behavior variables. This flexibility extends the framework beyond the fixed models typically used in conventional systems. This extension can overcome some of the limitations inherent in fixed model based systems, albeit performing the calculations with a completely different kind of calculation system.

The statistical modeling of current behavior, and the comparison of this behavior to past models and ideal models (stored in memory for comparison) permits evaluation not just of behavior and future locations, but also of the safety and predictability of the behavior of the vehicle being modeled. For intelligent systems, an often-underestimated piece of information is to know when the system will not work properly, and to avoid using it in that situation. This capability can be included into the system. The models can be applied both to extra-vehicular object behavior, and to the driver's own vehicle's behavior. This allows identification of unsafe and/or unpredictable behavior on the part of any object that can be compared to the models.

Examples described below refer to vehicle applications in detail. However, the invention also includes non-vehicular applications, and these examples are not meant to be limiting.

Figure 1:
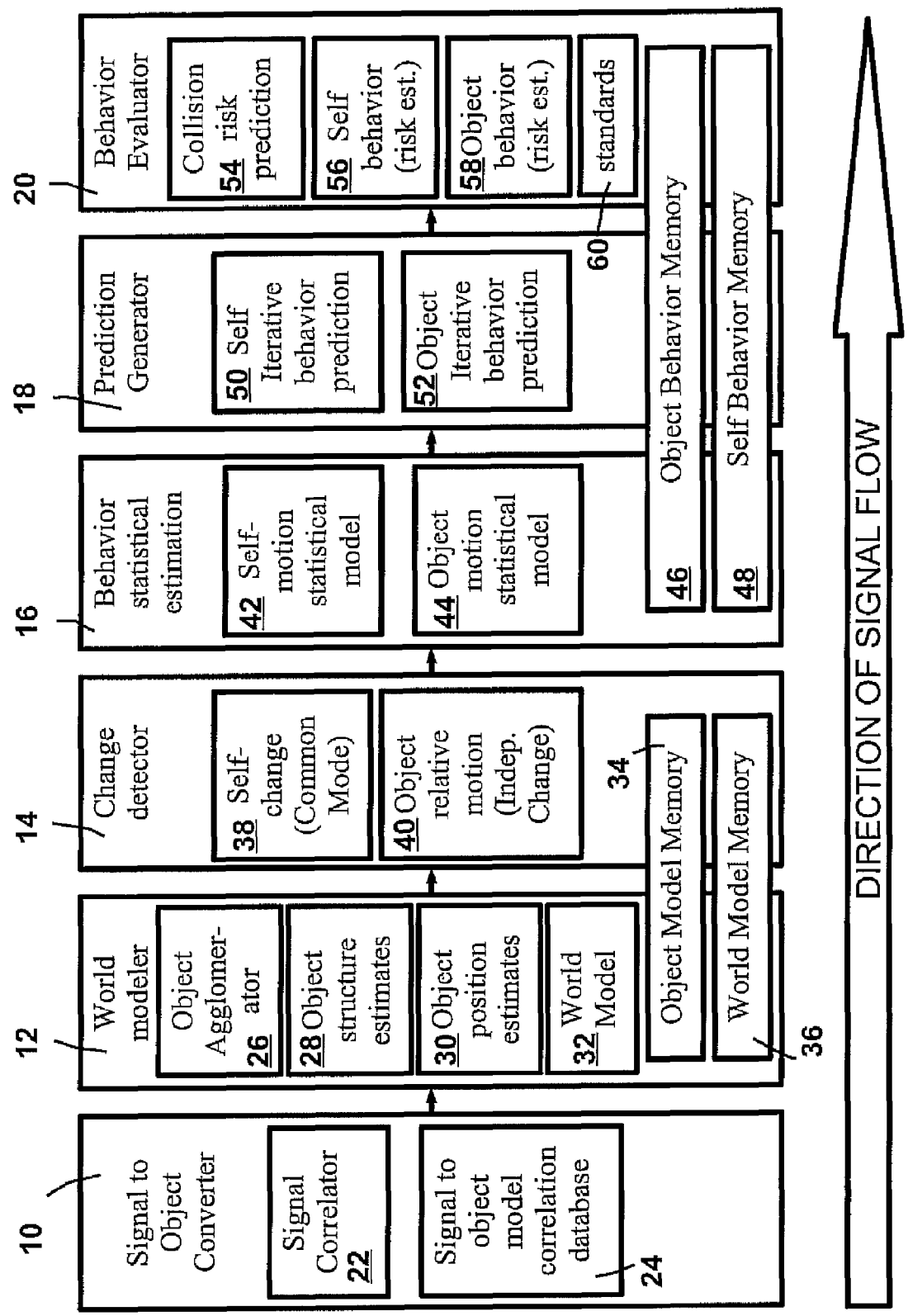
FIG. 1 shows a processing flow chart for a system according to the present invention.

FIG. 1 illustrates an example processing sequence for a threat-prediction system, which includes six stages, namely a signal-to-object converter 10, world modeler 12, change detector 14, behavior statistical estimation 16, prediction generator 18, and behavior evaluator 20. Common memory components integrate the world modeler and change detector (permitting modeled location and dynamics to support the detection and modeled dynamics for times in the near future), and the fourth through sixth stages (memory of particular objects and their behaviors supporting evaluation of behavior and prediction of future expected locations), respectively.

The signal to object converter 10 identifies objects, such as other vehicles, within the vehicle environment, receiving sensor signals provided by one or more sensors. The signal to object converter includes a signal correlator 22 for the object identification, and a signal-to-object model correlation database 24 to assist object identification. Object identification may use distinct sensor signatures characteristic of certain objects, which may be stored in the correlation database.

Signatures may include color, extent, shape, or other property, and may be combined with image recognition software, either associated with the sensor system or elsewhere within the system.

In this example, correlated clusters of sensor signals, such as signals having similar or related properties (such as sensor pixels within a certain color range, intensity range, distance, location, and the like) are segmented into objects. Correlated pulse timing, analogous to pulsed neuron approaches, may also be used. For example, sensor pixel firing frequency may be used as a proxy for intensity. For some sensors, pulse timing may be used to segment objects.

The world modeler 12 constructs a model of the vehicle environment. The world modeler includes an object agglomerator 16 to combine data clusters that are determined to be sub-objects of a larger object. Object structure estimates 28 and object position estimates 30 are determined, and are used in the creation of a world model 32 of the vehicle environment, which is stored in the world model memory 36. Object models, including object structure estimates and object position estimates for each model, are stored in the object model memory 34. There may be multiple objects, each with associated parameters such as position, speed, and the like. Objects of the same type may use the same object model, otherwise different object models may be used for each object. The world model may further include ambient conditions, multiple objects, and vehicle parameters. Over time, the models may adapt automatically to observed behavior of certain object types.

The change detector 14 includes a self-change detector 38 and independent object change detector 40. The self-change detector determines changes in the vehicle parameters, such as in position and speed of the vehicle. The independent object change detector determines independent changes in the object parameters, compensating for changes in the vehicle parameters. For example, a stationary object would be sensed as closer as the vehicle approaches, but compensation for vehicle motion shows that there is no independent change in the object position parameter.

A behavioral statistical estimator, represented by box 16, includes a self-motion statistical model 42 (for the sensing vehicle), and object motion statistical model 44 for the object. There may be a plurality of object models. The self-behavior memory 46 is used to store behavior statistical information relating to the sensing vehicle, and the object behavior memory 48 is used to store behavior statistical information relating to objects in the vehicle environment.

Prediction generator 18 includes self-iterative prediction generator 50 and object iterative behavior prediction generator 52. The prediction generator predicts vehicle motion and the object iterative behavior prediction generator predicts object motion.

Behavior evaluator 20 includes a collision risk estimator 54, self-behavior risk estimator 56, and object risk estimator 58. The collision risk estimator provides an alert to the vehicle operator if the vehicle is likely to collide with an object, using the statistical models of self-motion and object motion discussed above. The self-behavior risk estimator provides an alert if the vehicle behavior cannot be predicted with sufficient accuracy to perform a collision risk estimate, or if the vehicle behavior is otherwise erratic to a degree correlated with risk to the vehicle. The object risk estimator provides an alert if the object behavior cannot be predicted with sufficient accuracy to perform a collision risk estimate, or if the object behavior is otherwise erratic to a degree correlated with risk to the vehicle. Standards 60, stored in a standards memory, can be used for determining alert thresholds.

Figure 2:
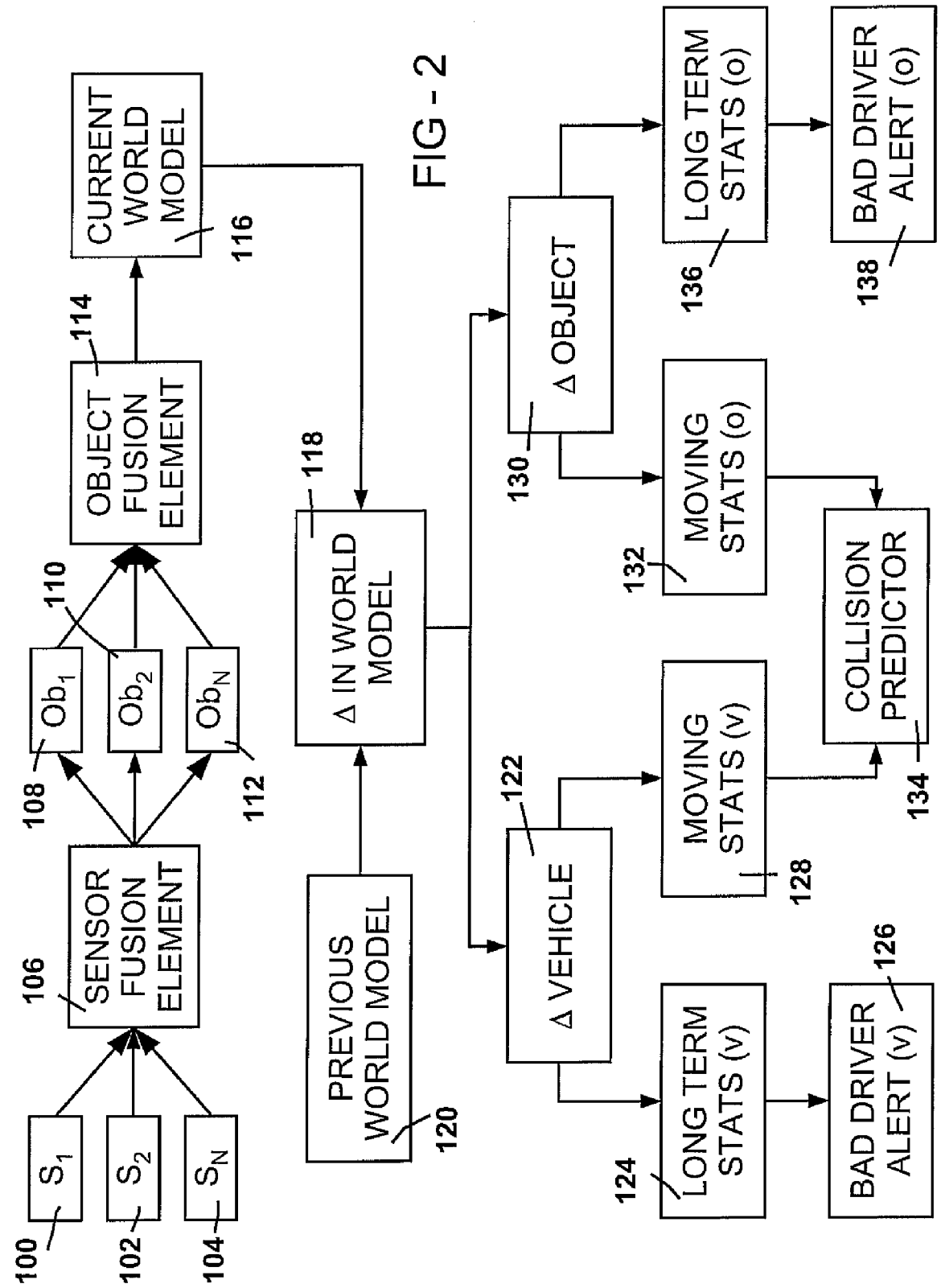
FIG. 2 is a schematic showing a possible system according to the present invention.

FIG. 2 is another schematic showing system components and a data-flow model that can be used to provide the capabilities of the system shown in FIG. 1. FIG. 2 shows sensors $S_1$, $S_2$, $S_N$ (there can be an arbitrary number of sensors, but here three are shown as a representative example) at 100, 102, and 104, feeding sensor data to a sensor fusion element 106. The sensor fusion element provides fused sensor data that represents the vehicle environment. Objects, represented by object models $Ob_1$, $Ob_2$, and $Ob_N$ at 108, 110, and 112, are then extracted from the fused sensor data.

Object fusion element 114 receives the object models, and combines any subcomponent objects that are apparently part of a larger combination. The fused object models are supplied to a current world model 116. The current world model is representative of the vehicle environment, and may also include vehicle data and data from any other sources.

The current world model is compared with a stored previous world model (120) in a world model comparator 118 to determine changes ($\Delta$) in the world model. The changes are separated into two categories: detected changes ($\Delta$) in vehicle parameters (also referred to as self-changes) at 122, and detected changes ($\Delta$) in object parameters at 130. There may be an arbitrary number of objects, but for illustrative convenience the analysis of only one object is shown.

The changes in the world model allow the behavior of objects to be determined, and also allows determination of the behavior of the vehicle (or other support) on which the sensor system is located. In the case of a vehicle mounted system, vehicle parameters (for the driver's vehicle and other vehicles) can be determined, including a set of vehicle paths, acceleration/deceleration parallel and perpendicular to vehicle paths, and the like. Unpredictable behavior, which may lead to lane changing, can be detected. In this example, the world model is a dynamic object model, where objects are modeled with dynamic parameters.

Road signs and markings may also be included in the world model. For example, a sensor system may include a road marking sensor, such as a lane position sensor.

Changes in vehicle parameters are used to determine vehicle long-term statistics, shown at 124. If the long term vehicle statistics indicate, for example, that the vehicle operation has become erratic, or if the uncertainty inherent in a prediction rises beyond a threshold level (alternatively, if the confidence in a prediction falls below a threshold level), a bad (or erratic) driver alert is provided at 126. Changes in vehicle parameters are also used to determine the moving statistics shown at 128, which indicate the direction and speed of the vehicle.

Changes in object parameters are used to calculate long-term object statistics, shown at 136. If these statistics show erratic or otherwise unpredictable behavior by the object, an alert is given at 138. Typically, the object will be another vehicle, and the alert then correspond to a bad driver alert for the other vehicle. The changes in object parameters are also used to determine object moving statistics at 132, which indicate the direction and speed of the object. A collision predictor 134 receives moving statistics for the vehicle and the object, and provides an alert if a collision is predicted (which may include dangerous proximity between the vehicle and the object, as well as actual physical impact).

In an example according to the present invention, the sensors are adaptive input sensors. The sensor fusion element is optional if, for example, a single omnidirectional sensor is used.

MIMO processors are preferably used to implement the following components of the system: the sensor fusion element 106, the object fusion element 116, the current world model 118, the previous world model 120, the world model comparator 118 for determining the change (Δ) in the world model, detecting the changes (Δ) in vehicle parameters at 122, and detecting the changes (Δ) in object parameters at 130. MIMO processors can be provided by spiking neuron systems.

Information processing systems, such as MIMO systems, that can be used in embodiments of the present invention are described in U.S. Pat. Nos. 6,859,689 and 6,539,290 to Vos, and U.S. Pat. No. 6,643,627 to Liaw et al. Image processing systems that can be used in embodiments of the present invention are described in U.S. Pat. No. 6,727,807 to Trajkovic. A sensor fusion approach that can be used in embodiments of the present invention is described in U.S. Pat. No. 6,580,973 to Leivian.

Adaptive models can be used for the following: the object models (108-112), the long term statistics for the vehicle and object (124 and 132, respectively), and the moving statistics for the vehicle and the object (128 and 132 respectively).

Figure 3:
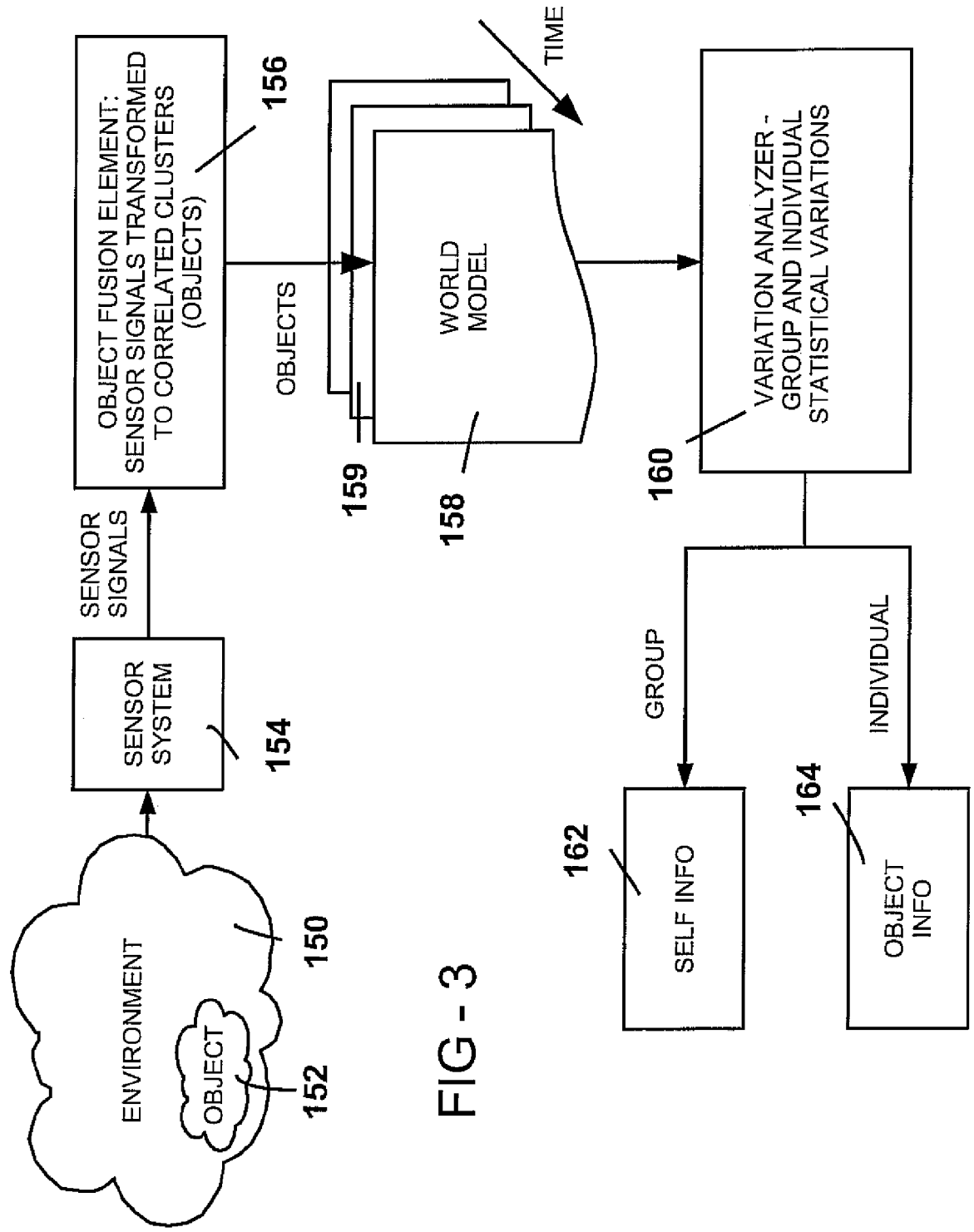
FIG. 3 illustrates the use of common and individual object variations.

FIG. 3 illustrates operation of a further example system. The system comprises sensor system 154, object fusion element 156, current world model 158, and world model variation analyzer 160. The environment 150 includes one or more objects, such as object 152. Sensor system 154 provides sensor signals to the object fusion element 156, in this example a cluster correlator which detects any clusters of correlated data within the sensor data. These data clusters represent objects within the environment (such as object 150), and the data clusters themselves may also be referred to as objects.

The data clusters are used to populate the current world model 158, which is updated at intervals as new data clusters are detected. A stack of world models is stored, including the latest (current) world model, and older versions such as the previous world model 159. Variations in the position and other properties of data clusters can be detected over time using the stack of world models. The variation analyzer compares the latest world model with one or more earlier world models, to determine variations in the world model. Changes detected may include a new object, or change in some property of an existing object.

The variations in the world model are used to determine self-information and object information (for one or more objects). For example, a common change in the location (or other property) of all detected objects, for two or more sensed objects, may be attributed to movement of the sensor system, and hence of the vehicle on which it is mounted. An individual change in the location or other property of one object, not shared by other objects, may be attributed to that object alone.

Figure 4:
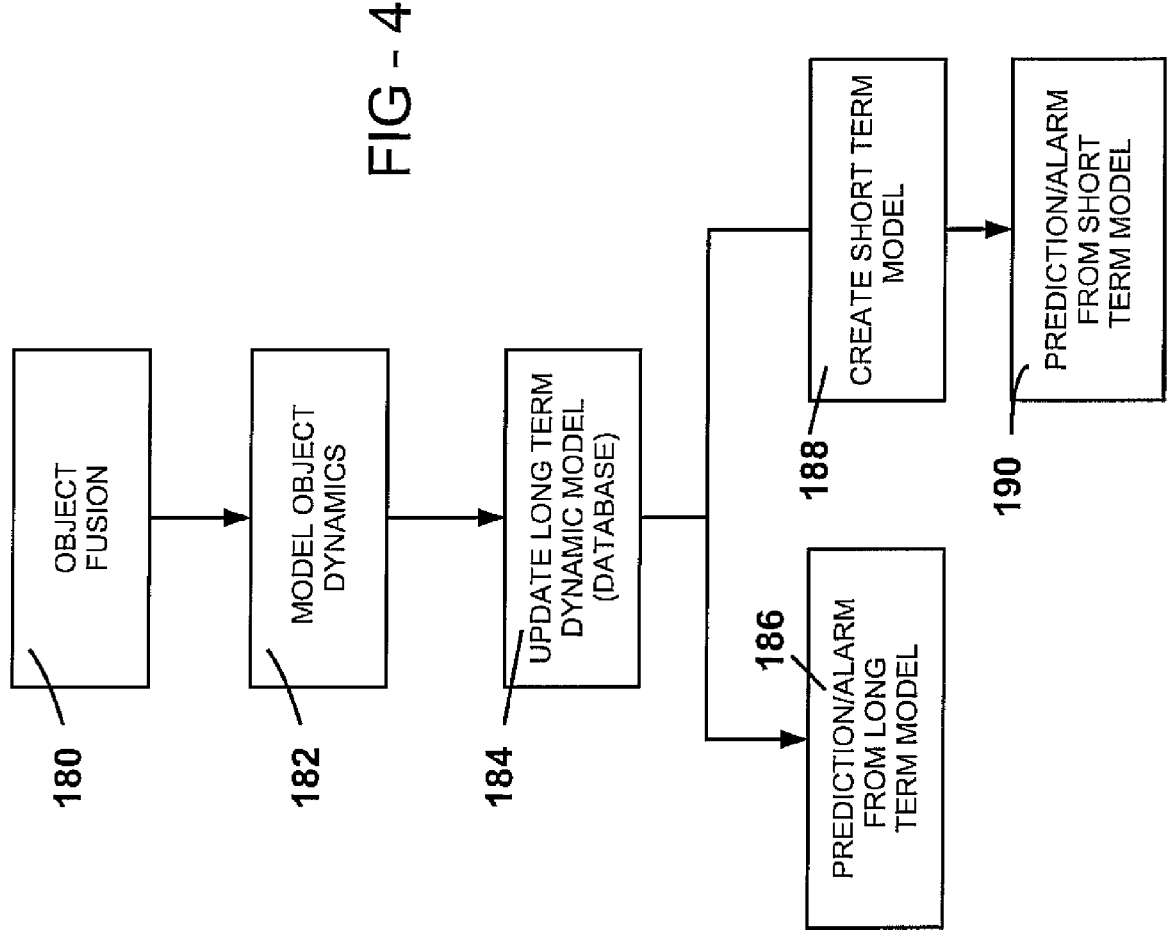
FIG. 4 is a flow chart showing a method of operation.

FIG. 4 illustrates a flow chart of a possible approach, which may be executed as an algorithm on a computer. Sensor data is provided by a sensor system (not shown). Having received the sensor data, objects are located by segmenting the data, for example by correlative clustering. Box 180 represents object fusion, for example segmenting received sensor data into correlated clusters representing objects. Box 182 represents modeling the dynamics of each object. In some examples, the object may be identified, and the world model may use an existing model of the object dynamics, for example with stored dynamic parameters for objects of the identified type. Box 184 represents updating the long term dynamic model using the results of the object modeling. A database may be used to store model parameters.

Having updated the world model, an alarm may be provided from both long-term and short term models. Box 186 represents providing an alarm and/or prediction, for example of a collision predicted from a long term model.

Box 188 represents creating a short term model of the environment from the long term model and object dynamics. Box 190 represents providing a prediction and/or alarm from the short term model, for example of unpredictable behavior of the vehicle on which the sensor system is mounted, or of other objects such as vehicles in the environment.

Figure 5:
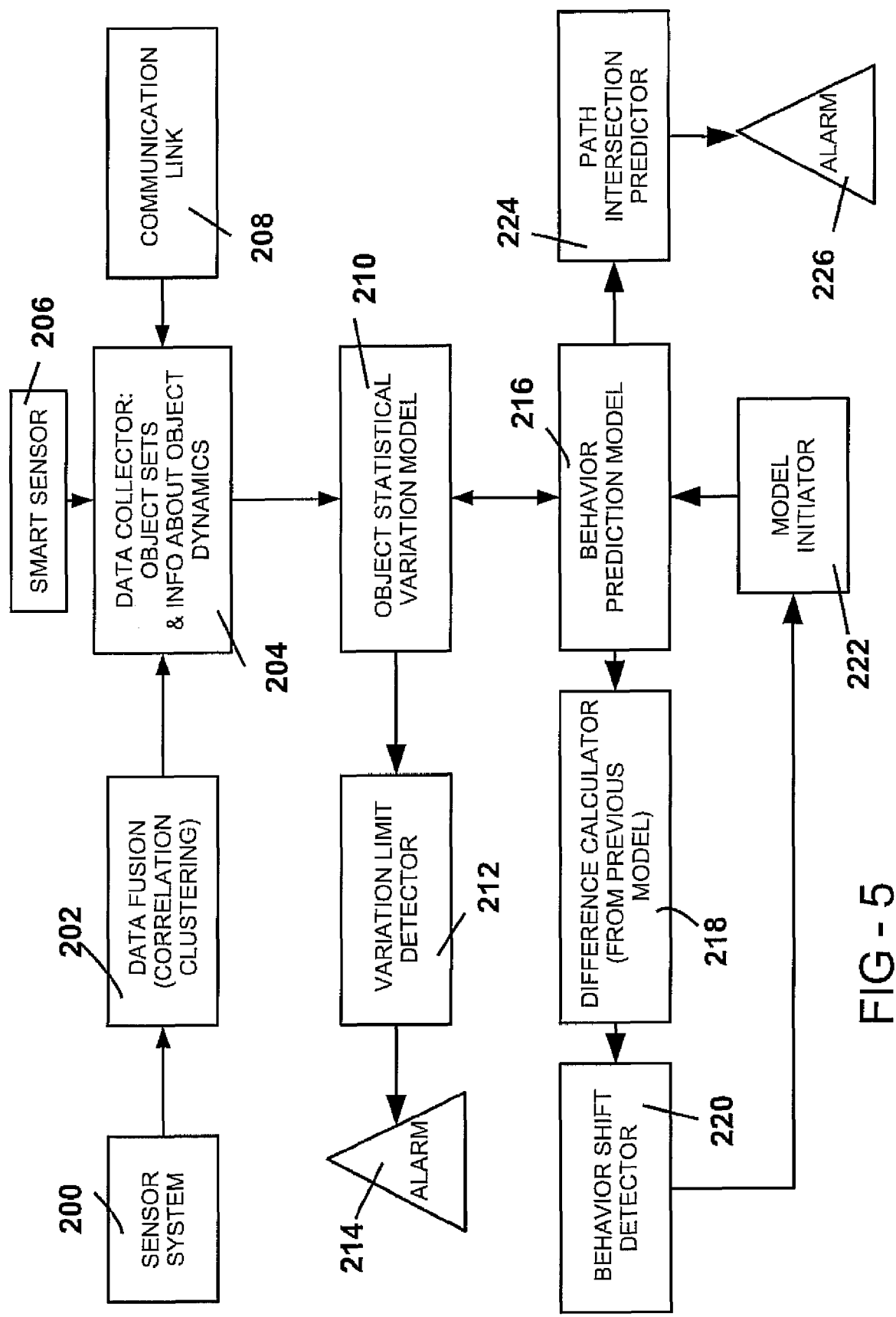
FIG. 5 is a schematic further illustrating a system according to the present invention.

FIG. 5 illustrates a further system example, comprising sensor system 200, data fusion element 202, data fusion element 202, data collector 204, smart sensor 206, communication link 208, object statistical variation model 210, variation detector 212, and alarm 214. The object statistical variation model is a long term dynamic model, which may be updated if necessary.

The data collector 204 includes dynamics and other data relating to objects identified by data fusion from the sensor system, and also relating to objects obtained by the smart sensor. Other data may be provided by the communications link. For example, the smart sensor may by an optical sensor with in-built image recognition software. Communicated information over link 208 is also input into the world model, and this may include information transmitted from other vehicles, or information received over a network, such as through a wireless Internet connection.

The variation detector 212 compares the variance of object properties over time against a threshold, and triggers an alarm if the threshold is exceeded. The alarm provides a warning of unpredictable behavior.

The system further comprises a short-term behavior prediction model 216, difference calculator 218, behavior shift detector 220, model initiator 222, path intersection predictor 224, and second alarm 226. The difference calculator 218 compares the current behavior prediction model with a previous model. The behavior prediction model is created or updated based on the latest object information, and used to predict the near-term behavior of the objects and the "self". The behavior shift detector determines if the behavior of objects was not correctly predicted, because of changing or incorrect knowledge of object behavior. A set of previous dynamic parameters may be stored in memory, for example in a ring buffer. Abrupt or large changes in dynamic parameters may be identified. In one approach, an actual measured distribution of dynamic properties may be used for predictive purposes, Alternatively, measurements may be compared to a mean value, and the mean value modified if necessary, which is less adaptive but possibly more stable.

The behavior prediction model may be dynamically updated using the model initiator 222, if behavior shifts are detected. Hence, a new model can be adopted dynamically if a previous model is not applicable.

The updated behavior prediction model is used to determine the likelihood of a collision (224), and an alarm (226) provided if a collision or other dangerous condition is predicted. Hence, collision prediction can be obtained using moving statistics, with a dynamically updated model. Alarms may be tailored to the likelihood of collision, application, personal preferences, and the lice.

Example Illustrating System Operation

A vehicle equipped with an external sensor drives down a street, and a stream of sensor data indicates relative positions of other objects with respect to the sensing vehicle. Within a single frame of time, separate objects are identified, and their positions in some relative space modeled. Objects detected in one frame can seed the modeling for the next frame. Differences in the estimates of object centers from one frame to the next can be used to create two separate components of movement: common mode variation indicating self-movement of the sensing vehicle; and individual changes, indicating a change in the object separate from the vehicles self-motion. These components can each be a combination of deliberate behavior, noise in the behavior, and noise resulting from the modeling and estimation process. Having identified contiguous objects, estimates are created of the behaviors and behavioral noise for risk assessment and predictive purposes. Preferably, this is done without over-fitting the data. These models can then be used to forecast a range of locations that the sensing vehicle and object (e.g. other vehicle) can enter over the following time-frames (given short and longer term models) to identify if the paths will significantly intersect in any of the next several upcoming time-frames.

Sensor Systems

The vehicle sensor system may include one or more sensors, of the same type or any combination of types. Sensors may include imaging sensors (such as cameras and video devices), Doppler shift sensors of any type for determining relative object speeds (including radar, laser, or IR based Doppler sensors), IR sensors, millimeter-wave sensors, microwave sensors, ultrasound sensors, proximity sensors of any type, and the like. For example, a sensor system may include millimeter-wave, microwave, IR-based, or laser radar for determining distance, relative speed, and bearing of objects within the vehicle environment. A sensor system may include one or more imaging sensors. Distances and/or object sizes may be determined using a rangefinder, (auto)focus setting of an imaging device, or other approach.

A sensor system may also include ambient condition sensors, providing sensor signals correlated with ambient conditions such as external temperature, precipitation (such as rain or snow), road condition (e.g. roughness or the presence of water or ice), and the like. Ambient condition sensor data can be used to estimate road-holding, and to modify models of vehicle or other object behavior. Sensors may also include a lane marking sensor used to monitor the sensing vehicle or object (e.g. other vehicle) position within a lane, or other sensors responsive to road markings, traffic signals, signs, or the presence of emergency vehicles. Such sensor data can be used to establish the path of lanes within a world model, and hence for predicted path calculations.

Sensors may also be used to self-monitor the vehicle, for example sensing vehicle parameters such as vehicle speed, acceleration (in one or more dimension), throttle position, engine rpm, brake operation (pedal position and/or ABS operation), steering input, yaw rate, wheel slip, passenger occupancy and weights thereof (for example, to modify a vehicle behavior model), other engine input, drive component configuration (such as road wheel angle for automobiles), control surface orientation and deployment for airplanes (such as aileron or rudder), rudder orientation for boats, nozzle configuration for spacecraft), or other parameter. A sensor system may also include GPS or other position sensor for vehicle position, speed, or altitude measurements. Vehicle velocity may be determined as the time derivative of position, and acceleration as the time derivative of velocity. The sensor system may also monitor the vehicle operator, for example using eye or gaze tracking, or monitoring physiological parameters, such as physiological parameters correlated with tiredness.

The sensor system may also receive data from remote sources, for example over wireless communications links, or obtain data from other sources. For example, weather, road, traffic, radar, or other data may be received. Sensors may be located remote from the vehicle, for example at the roadside or embedded in the road, and communicate sensor data to the vehicle wirelessly. Sensors may be directed forwards, backwards, or to the side of the vehicle, or some combination thereof including omnidirectional sensors.

A sensor fusion element can be used, for example, to combine image data from multiple image sensors, of the same or different types, into a representation of the vehicle environment. A MIMO processor can be used for the sensor fusion element.

Statistical Models

A system that fuses data from an arbitrary set of extra-vehicular sensors isolates separate objects and predicatively models their behavior based on statistical models of the observed object behaviors. The statistical models can be used in three ways:

(1) To observe when a vehicle behavior is too erratic to be predicted well (when the statistical model has more than an overall safety threshold of variance—like a drunk or drowsy driver who is weaving too much)

(2) To determine when a driver's behavior has varied significantly from recent patterns (driver's performance has surpassed a local measure of recent variance, which could indicate distraction, onset of fatigue, deliberate behavior change, inebriation, illness, emotional state, or other source of degraded performance.)

(3) A predictive model can be used to estimate the likelihood that any sensed object will coincidentally occupy the same space as the sensing vehicle.

The prediction of an impending event or the identification of poorly predictable driving triggers an alert to warn the driver of the situation. When this alert occurs in conjunction with an increased probability of an accident (based on the estimates that do exist), some other automatic behavior can be initiated to prevent the collision or to mitigate the harm of the collision if it cannot be avoided.

The vehicle model can be modified by sensor data, for example relating to road conditions, speeds, driving style (as determined from time-dependent sensor data), and the like. The vehicle model can include vehicle mass, optionally including passenger and freight loading, if appropriate.

The object model used for a particular object can be selected or modified based on object identification. Assuming the object is another vehicle, the type of vehicle may be identified, for example as a compact, mid-size, or full sized automobile, minivan, SUV, truck, or other vehicle type. Having identified the vehicle type, an appropriate model can be selected from a number of models stored on the system memory. The object model can then be further modified by ambient condition sensor data, such as by changing the object model to account for decreased road-holding if there is precipitation. In addition, the object model can be modified to individualize the behaviors of two similar objects within a common class, adapting them to incorporate recently observed path statistics.

Collision Prediction

Models for the vehicle and for one or more objects in the vehicle environment are used to predict the vehicle path and the object path(s). The predicted paths have a probability distribution in two or three dimensions. For a land-based vehicle moving on a flat road, a two dimensional path may be sufficient. For a vehicle on undulating terrain, or an airplane, a three-dimensional path can be calculated. The collision probability between the vehicle and an object can be determined by multiplying probabilities that the vehicle and object will occupy the same space, for various times in the future, using predicted vehicle and object paths. A collision alert can be provided if the probability of collision (or close proximity) is above a threshold value. An alert may not be provided if the time to collision is longer than a certain value, such as longer than 10 seconds, as such alerts may be considered unhelpful, or shorter than the possible reaction time of the vehicle operator.

The predicted paths have an uncertainty, which can be characterized as a vehicle path variance. This vehicle path variance represents the uncertainty in the actual vehicle path at future times relative to the current position and world model. This variance can be calculated with respect to the position of the vehicle on which the system resides, or can be calculated relative to something else in the environment, like a road, a lane of the road, or some other environmental component. If the vehicle path variance is greater than a threshold at any given time, an alert can be provided to the vehicle operator. The threshold value may be determined from previously calculated vehicle path variances, for example an alert is given if the uncertainty in the vehicle path is greater than previous values, or some average and/or multiple thereof.

In the example of a fixed object, such as a tree, the predictability of collision with the tree is equal to the predictability of the vehicle behavior. A vehicle model allows prediction of a vehicle path in the vehicle environment. The predicted vehicle path includes a variance around the most likely path, and the variance is related to a reliability estimate or uncertainty for the predicted path. An alert can be given for the threat of collision with the tree even if the most likely vehicle path misses the tree, if the vehicle behavior is unpredictable enough that the tree lies within the variance around the most likely path. In effect, the tree may lie in a zone of uncertainty corresponding to possible paths, but not the most likely path. In this case, the probability of collision is related to the probability of a vehicle path that intersects with the tree. A collision alert can be given if this probability corresponds to a likelihood of collision, this being a probability greater than a threshold probability. The uncertainty in the predicted vehicle path may be so great that the probability of collision is low. However, a system according to the present invention can then provide an erratic driving alert if the uncertainty is greater than a threshold uncertainty.

In the case of a mobile object, a collision alert is provided if there is a likelihood of collision. The object path is predicted using an object model, and the uncertainty in the object path may be greater than a threshold uncertainty, reducing the accuracy of collision prediction. In this case an erratic object alert can be given. If the object is another vehicle, this corresponds to an erratic other driver alert.

An alert can be framed as a collision warning and/or a bad driving warning, for example as determined by the size of the variance spread. If the variance is within an acceptable level, the vehicle behavior can be considered predictable, and a collision alert given if the path of the vehicle, including any unpredictability, indicates a collision will occur. If the variance is outside an acceptable level, a warning may be given of erratic driving, even if no collision is predicted.

The vehicle path may only be predicted for a certain range of future times, corresponding to those most likely to allow a useful warning to be given. The range of future times may be limited to reduce computational complexity, to reduce the number of alerts provided to the vehicle operator, to increase the helpfulness of such alerts, or some combination of factors.

The object path variance represents the uncertainty in predicting the object path. If the object path variance is greater than a threshold value, an alert can be provided to the vehicle operator. The threshold object path variance may have a predetermined level, for example above which a collision cannot be reliably predicted. The threshold may be associated with an identified type of object; for example, a threshold variance for another vehicle may be similar to that used for the sensing vehicle.

Alerts

An alert to a vehicle operator is provided if a collision risk is determined between the vehicle and an object in the vehicle environment. In one approach, the probability of collision is determined and compared with a threshold probability. The alert is given if the probability exceeds the threshold. An alert is also given where the system cannot reliably determine the probability of collision. For example, a low probability may be calculated, but the standard error in the calculation exceeds some acceptable value. In one case, the vehicle behavior is unpredictable, for example if the vehicle operator is having control problems. The control problems may be physiological issues with the driver, e.g. tiredness or inebriation, or due to difficult ambient conditions such as road iciness.

For an erratic driving alert, vehicle parameters may be considered over a longer time than for collision prediction warnings. For example, a vehicle may have a steady speed and steering input as it enters a stretch of roadway, allowing collision probabilities to be calculated. However, over a longer time period, such as minutes, steering and throttle controls may have shown variations beyond those necessitated by road conditions. These variations may be used to trigger an erratic driving warning. Also, the variance in calculated vehicle path can be increased including the possibility of further erratic driving based on recent behavior.

The behavior of an object in the vehicle environment may also be unpredictable, for example if another vehicle has a driver with control problems. The object model is used to calculate a predicted path, which includes a most likely path and a variance around most likely path. If the variance is above a threshold, an alert can be given to the vehicle operator. If the variance is below a threshold, a collision alert can be given if the probability of collision is above a threshold value.

Alerts may take the form of visual alerts (such as lamps or information displays), audible alerts (including spoken alerts such as 'Look out!', tones, and/or other audible signals), haptic alerts (such as a vibrating steering wheel or pedal), or other alert distinguishable by the driver. The alert may comprise electronic data fed to an autopilot system, or electronic signal provided to any device for the purpose of facilitating safe operation of the vehicle. A vehicle infotainment device (such as radios), cell phone, or other electronic device may be used to provide an alert to vehicle operator. Alerts may also be provided to other locations, for example to facilitate monitoring of vehicle operation performance. Alerts may be provided to a central location, such as a business location with which the vehicle is associated (e.g. trucking company or taxi dispatcher), police or other authorities, other operations coordinator, or other location or person.

Other Applications

A system according to the present invention can be used on vehicles other than automobiles, such as airplanes, boats, submarines, and the like. A system can also be used to guide a person needing assistance in moving through an environment, such as a visually impaired person.

In the case of an airplane, an alert can be given if there is a risk of collision with another plane or with terrain, or if there is unpredictability in the planes motion (such as inconsistent altitude, pitch, heading, or other parameter), or unpredictability in similar parameters associated with another flying vehicle within the environment of the plane. In the case of a personal system, the sensor system may be carried by the person, for example within a headset, helmet, or otherwise distributed about a person's body.

Automated Systems.

A system according to the present invention can be used in an automated cruise control system, with automated brake, steering, or other vehicle control inputs provided to maintain a safe distance from other vehicles.

A system according to the present invention may be used in an improved automated evasion system for a vehicle. The system may generate vehicle control inputs, such as steering, throttle, and braking inputs, so as to reduce the probability of a collision. As the effects of vehicle control inputs modify the vehicle behavior, revised models are calculated, and control inputs reduced if the probability of collision is reduced.

The system may also stabilize a vehicle input, such as throttle position or steering input, in order to bring a vehicle under safe control, for example if previous sensor inputs indicate large unpredictability. This may be helpful in the case where a vehicle operator becomes incapacitated. An emergency algorithm may be implemented, for example to guide a vehicle to the side of the road and stop, or to land an aircraft, or otherwise guide the vehicle to a safe state.

If a vehicle is using an auto-pilot as the vehicle operator, an alert from a system according to the present invention can be used to modify or over-rule the operating protocols of the auto-pilot, for example by inducing a change in speed or direction of the vehicle. Once the threat has receded, normal autopilot control can be resumed. Alternatively, the alert may be provided to a person having capacity to over-rule the autopilot.

Patents, patent applications, or publications mentioned in this specification are incorporated herein by reference to the same extent as if each individual document was specifically and individually indicated to be incorporated by reference.

The invention is not restricted to the illustrative examples described above. Examples are not intended as limitations on the scope of the invention. Methods, systems, and the like described herein are exemplary and not intended as limitations on the scope of the invention. Changes therein and other uses will occur to those skilled in the art. The scope of the invention is defined by the scope of the claims.

Having described our invention, I claim:

1. A method of facilitating safe operation of a vehicle, the vehicle having a vehicle operator and having a vehicle environment including an object, the method comprising: obtaining sensor data relating to the vehicle environment; predicting a vehicle path within the vehicle environment, the vehicle path having a vehicle path uncertainty; predicting an object path for the object within the vehicle environment; identifying a collision risk if the vehicle path and the object path intersect; identifying a vehicle risk if the vehicle path uncertainty is greater than a threshold uncertainty; providing an alert on identifying the collision risk or the vehicle risk, the alert facilitating tile safe operation of the vehicle; determining an object oath uncertainty for the object path; identifying an object risk if the object oath uncertainty is greater than an object threshold uncertainty; providing the alert on identifying the object risk; and wherein predicting the vehicle path includes: creating a world model of the vehicle environment using the sensor data; detecting changes in the world model at intervals, the vehicle path and the object oath being predicted from the changes in the world model.

2. The method of claim 1, wherein the world model is created using a multiple-input multiple-output (MIMO) algorithm.

3. The method of claim 2, wherein the multiple-input multiple-output (MIMO) algorithm is a spiking neuron algorithm.

4. The method of claim 1, further comprising:
identifying the object within the vehicle environment using the sensor data; and
selecting an object model for the object using identification of the object,
the object path being predicted using the object model.

5. The method of claim 4, further comprising:
identifying of a plurality of objects within the vehicle environment using the sensor data;
selecting an object model for each object using identification of that object;
predicting the object path for each object; and
providing the alert if any object path intersects with the vehicle path.

6. The method of claim 5, further comprising:
determining an object path uncertainty for each object path;
identifying an object risk if the object path uncertainty of any object is greater than a threshold value for that object; and
providing the alert on identifying the object risk.

7. The method of claim 1, wherein the sensor data is provided by a sensor system,
the sensor system including at least one sensor chosen from the group consisting of an image sensor, IR sensor, microwave sensor, millimeter wave sensor, ultrasound sensor, and laser sensor.

8. The method of claim 1, wherein obtaining sensor data at intervals includes receiving sensor data from one or more image sensors.

9. The method of claim 8, further comprising identifying the object within the vehicle environment using an image processor.

10. The method of claim 1, wherein the threshold uncertainty for the vehicle path uncertainty is determined from previously calculated vehicle path uncertainties.

11. The method of claim 1. further comprising determination of an object path uncertainty, and providing the alert if the object path uncertainty is greater than an object threshold uncertainty.

12. The method of claim 1, further comprising:
creating a statistical object model for the object in the vehicle environment using the sensor data, the object path being predicted using the statistical object model.

13. The method of claim 1, wherein said sensor data is obtained via a communication link with an outside source.

14. A method of facilitating safe operation of a vehicle, the vehicle having a vehicle operator and a vehicle environment including an object, the method comprising: collecting sensor data representative of the vehicle environment; identifying the object within the vehicle environment using the sensor data;
creating a world model, the world model including an object model for the object and a vehicle model for the vehicle; detecting changes in the world model at intervals;
predicting a vehicle path for the vehicle from changes in the world model, the vehicle path having a vehicle path uncertainty; predicting an object path from changes in the world model, the object path having an object path uncertainty; and providing a collision risk alert if a collision between the vehicle and the object is predicted from the vehicle path and the object path, providing a vehicle risk alert if the vehicle path uncertainty exceeds a vehicle uncertainty threshold, and providing an object risk alert if the object path uncertainty exceeds an object uncertainty threshold, so as to facilitate the safe operation of the vehicle; and wherein providing the vehicle risk includes: determining vehicle parameters from the changes in the world model; determining long-term statistics for the vehicle parameters; and identifying the vehicle risk using the long-term statistics of the vehicle parameters.

15. An apparatus for reducing an accident risk for a vehicle, the vehicle having a vehicle operator and a vehicle environment including an object, the apparatus comprising: a world modeler, the world modeler receiving object data correlated with objects in the vehicle environment and creating a world model including object parameters and vehicle parameters; a world model change detector, detecting changes in the world model at intervals, the world model change detector identifying vehicle parameter changes and object parameter changes; a vehicle path predictor, using the vehicle parameters to predict a vehicle path; an object path predictor, using the object parameters to predict an object path; a behavior evaluator, providing a collision alert on establishing a collision risk from the vehicle path and the object path, providing a vehicle risk alert if the vehicle path has an uncertainty greater than a first threshold value, and providing an object risk alert if the object path has an uncertainty greater than a second threshold value; and wherein providing the vehicle risk includes: determining vehicle parameters from the changes in the world model; determining long-term statistics for the vehicle parameters; and identifying the vehicle risk using the long-term statistics of the vehicle parameters.

16. The apparatus of claim 15, further comprising:
a sensor system, receiving sensor data correlated with the vehicle environment; and
an object identifier, operative to identify objects within the vehicle environment, and to determine object data associated with the objects.

17. The apparatus of claim 16, wherein the sensor system includes at least one imaging sensor.

18. The apparatus of claim 16, wherein the object identifier comprises an image processor receiving sensor signals from the imaging sensor.

19. The apparatus of claim 16, wherein the world modeler comprises a multiple-input multiple-output (MIMO) algorithm.

20. The apparatus of claim 15, wherein the multiple-input multiple-output (MTMO) algorithm is a spiking neuron algorithm.

21. The apparatus of claim 15, further comprising a communication link with an outside source, the communication link providing sensor data from the outside source with respect to the vehicle environment.

* * * * *

UNITED STATES PATENT AND TRADEMARK OFFICE
CERTIFICATE OF CORRECTION

PATENT NO. : 7,579,942 B2  Page 1 of 1
APPLICATION NO. : 11/539686
DATED : August 25, 2009
INVENTOR(S) : Steven F. Kalik It is certified that error appears in the above-identified patent and that said Letters Patent is hereby corrected as shown below:

Column 6, line 59 replace "lice" with --like--

Signed and Sealed this

Tenth Day of November, 2009

David J. Kappos
*Director of the United States Patent and Trademark Office*